Mar. 13, 1923.

D. M. LUEHRS 1,448,669

DOUGHNUT MAKING MACHINE

Filed Nov. 4, 1920

Inventor
Daniel M. Luehrs.

By Robert Upton
Attorney.

Mar. 13, 1923.                                                              1,448,669
              D. M. LUEHRS
           DOUGHNUT MAKING MACHINE
        Filed Nov. 4, 1920              4 sheets-sheet 4
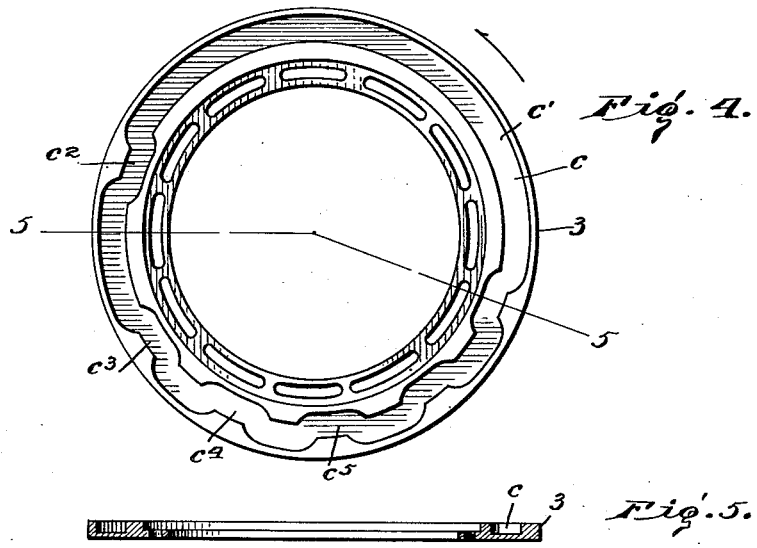
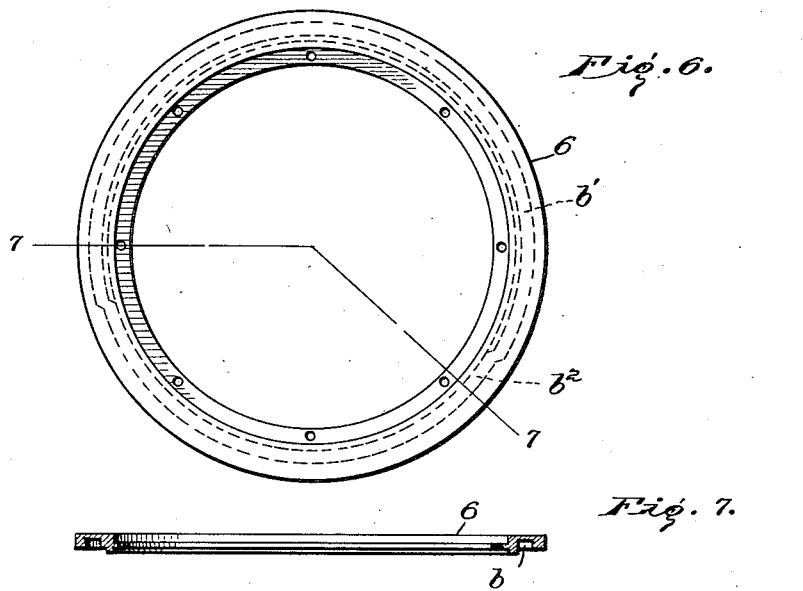
Inventor
Daniel M. Luehrs.
By Robert Urlson
                Attorney Patented Mar. 13, 1923.

1,448,669

UNITED STATES PATENT OFFICE.

DANIEL M. LUEHRS, OF CLEVELAND, OHIO.

DOUGHNUT-MAKING MACHINE.

Application filed November 4, 1920. Serial No. 421,754.

*To all whom it may concern:*

Be it known that I, DANIEL M. LUEHRS, a citizen of the United States, residing at Cleveland, in the county of Cuyahoga and State of Ohio, have invented certain new and useful Improvements in Doughnut-Making Machines, of which the following is a specification.

This invention relates to a machine for making doughnuts and delivering them into a frying tank. In my co-pending application, Serial No. 415,361, filed October 7, 1920, I have shown a doughnut frying apparatus comprising a closed tank, adapted to contain hot grease, and conveyer belts for carrying the doughnuts through the tank submerged in the grease, one of said belts, constituting a feed belt, being arranged to receive the raw doughnuts as they are dropped into one end of the tank. The machine of the present invention is designed particularly for use in connection with the aforesaid frying apparatus, and it comprises a carrier rotatable about a vertical axis and provided with a plurality of dough hoppers which are caused to move in succession over an opening in the tank above the feed belt as the carrier rotates. The hoppers are provided with annular outlets, and, as the hoppers move over the feed belt, dough feeding and cutting devices operate, the former to force a tube of dough through the outlet, and the latter to cut off sections of the tube to form the raw doughnuts. The doughnuts thus formed drop into the hot grease in the tank and sink on to the submerged feed belt. As the hoppers pass from over the belt, the dough feeding and cutting devices automatically stop. The invention also comprises means for changing the relative speeds of the dough feeding and cutting devices, whereby the quantity of dough in the doughnuts may be regulated.

In the accompanying drawing, Fig. 1 is a central vertical section through the machine;

Fig. 4 is a top plan view of the cam for operating the cutters;

Fig. 5 is a section on the line 5—5 of Fig. 4;

Fig. 6 is a top plan view of the cam for controlling the operation of the dough feeding mechanism, the cam groove being shown in dotted lines; and, Fig. 7 is a section on the line 7—7 of Fig. 6.

Figure 1:
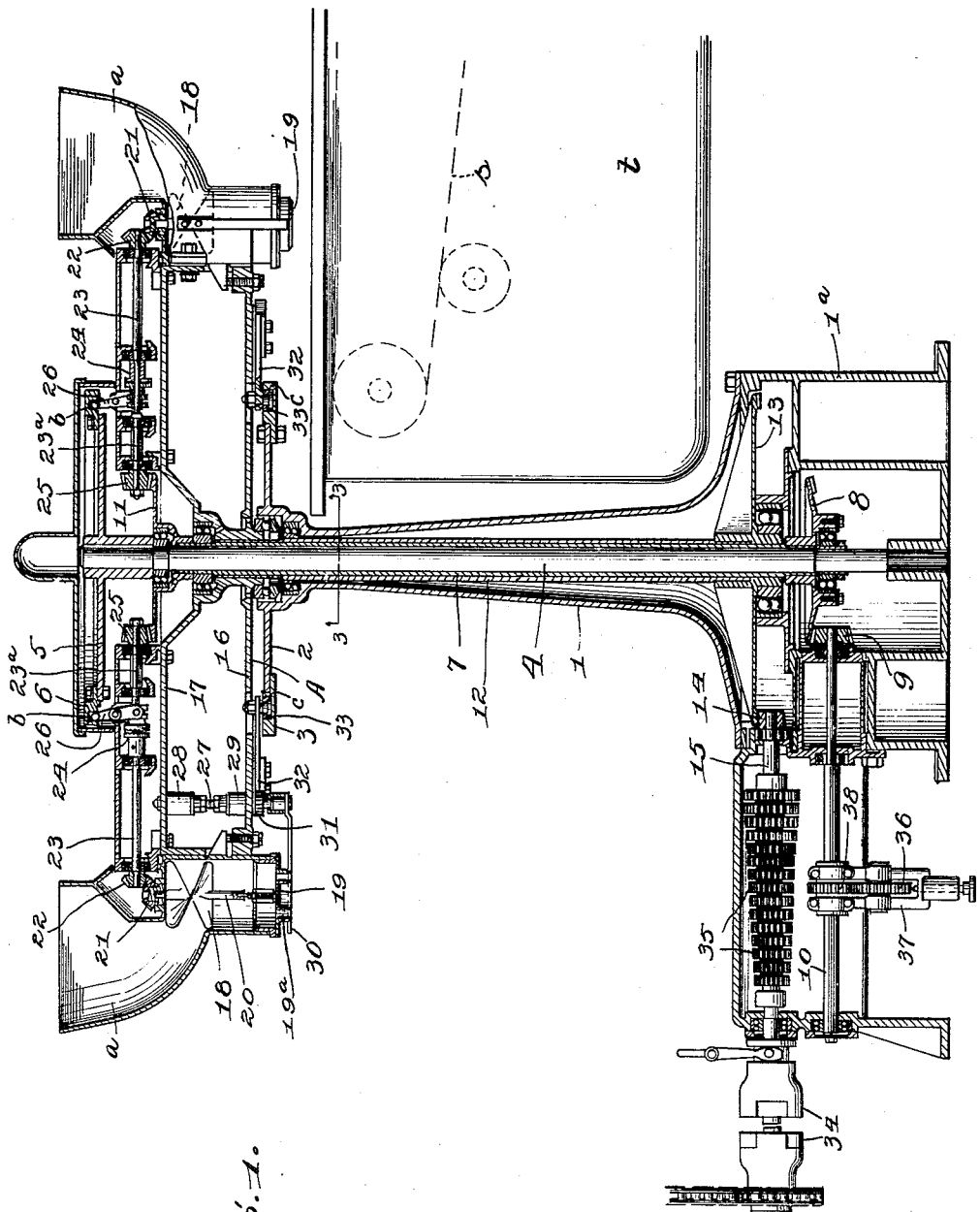
Figure 2:
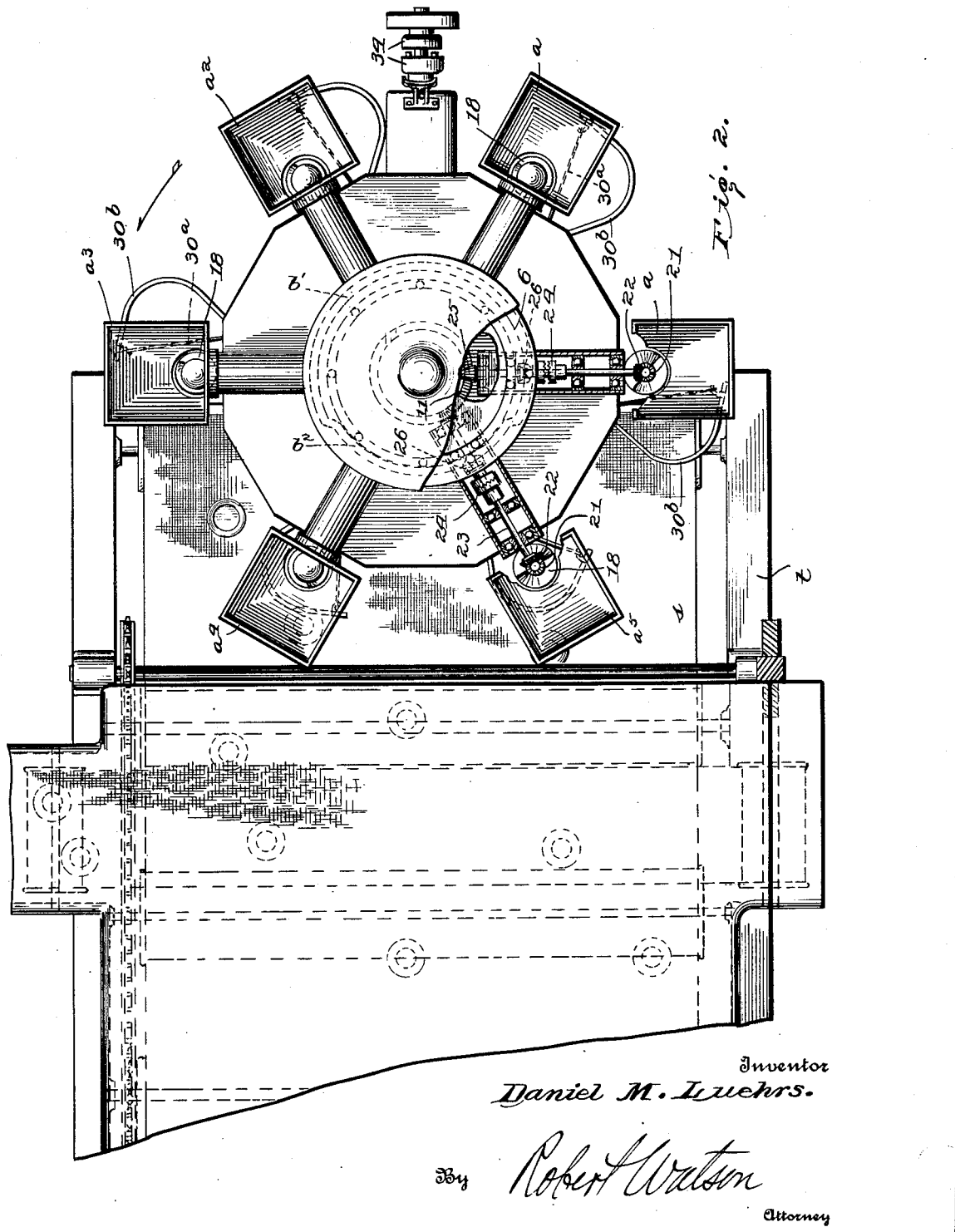
Fig. 2 is a top plan view of the same.

Referring to the drawing, 1 indicates a tubular standard mounted upon a hollow base $1^a$, and having at its upper end a horizontal disk or flange 2, which carries an annular cam 3, which cam is illustrated in detail in Figs. 4 and 5 and will be hereinafter more particularly referred to. Arranged centrally within the standard 1 is a stationary shaft or post 4, which projects above the standard and carries a fixed plate or disk 5, to which is secured an annular cam 6, the latter being illustrated in detail in Figs. 6 and 7. Surrounding the stationary shaft 4 is a tubular shaft 7, which has at its lower end, within the base $1^a$, a gear 8 which meshes with a pinion 9 upon a horizontal shaft 10. A gear 11 is secured to the upper end of the tubular shaft 7 and drives the doughnut feeding devices hereinafter described. Another tubular shaft 12 surrounds the shaft 7 and is provided at its lower end with a gear 13, which meshes with a pinion 14 upon a horizontal drive shaft 15. Upon the upper end of the shaft 12, and secured thereto, is a rotatable head or carrier A, comprising two spaced spiders 16 and 17, which is rotatable by means of the shaft 12 between the stationary cams 3 and 6.

A plurality of dough hoppers $a$—$a^5$ are secured to the head or carrier at its periphery and are evenly spaced apart. Within each hopper is arranged a feed screw 18, for forcing dough through an annular opening $19^a$, in a fitting 19, which constitutes a mold for the doughnuts. Each hopper is provided with a feed screw and these screws are operated by power transmitted through the shaft 7 and gear 11 to independent mechanisms which permit of the operation of some of the feed screws while others are stopped. As these mechanisms are alike in construction a description of the mechanism associated with one hopper will suffice for all. As shown, each feed screw 18 is mounted upon a vertical shaft 20, carrying at its upper end a bevel gear 21, which meshes with a similar gear 22, upon a shaft 23 which is mounted horizontally upon the top of the carrier. A clutch 24 is provided for connecting this shaft with a shaft $23^a$ having a gear 25, which meshes with the gear 11 upon the shaft 7. A short clutch lever 26 engages a groove $b$, in the cam 6, and controls the clutch 24 to cause the operation of the feed screw during a part of the revolution of the carrier and to stop the operation during the remainder of the revolution. The form of this cam groove is indicated in dotted lines in Fig. 6, from which it will be seen that the groove comprises a part $b'$, greater in length than a semi-circle, and a part $b^2$ of shorter radius than the part $b'$ and also shorter in length. When one of the clutch levers 26 is in engagement with the part $b'$ of the groove, the clutch 24 is held in open position, and when the clutch lever rides into the part $b^2$ of the groove, the clutch is moved to closed position.

Figure 3:
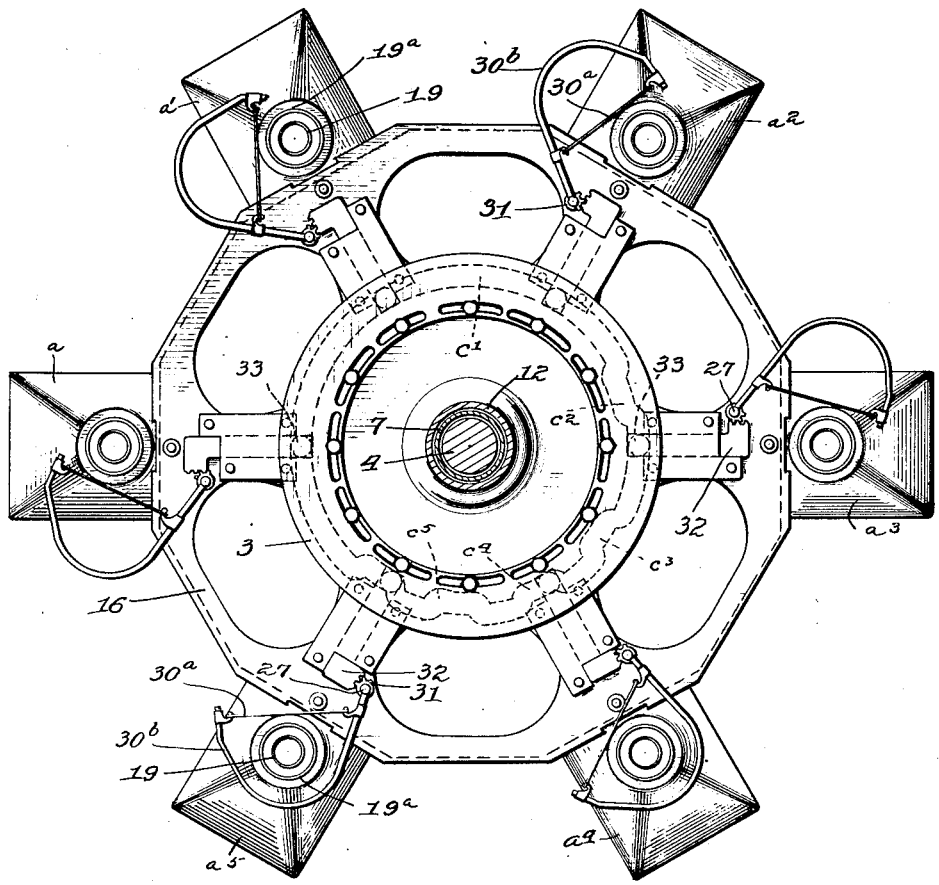
Fig. 3 is a section on the line 3—3 of Fig. 1, looking upward;

Vertically arranged rock shafts 27 are adjustably mounted in suitable bearings 28, 29, on the carrier adjacent the several hoppers. Each shaft has secured to its lower end, below the carrier, a cutter 30, movable across the face of the annular outlet $19^a$, to sever the dough pressed through said outlet by the feed screw. The preferred form of cutter is shown in Fig. 3, and it comprises a wire $30^a$, stretched across the arms of a bowed rod $30^b$, which latter is secured to the shaft 27. The shaft 27 carries a pinion 31, near its lower end, which is engaged by a rack bar 32, slidingly mounted on the lower side of the carrier. This rack bar has a roller 33, which engages the groove $c$ in the stationary cam ring 3. This groove is circular with inwardly set portions $c^2$, $c^3$, $c^4$, etc., at certain points. It will be evident that as the carrier rotates, the roller on the rack bar will follow the groove, and as the roller moves into one of the indented portions of the groove the cutting wire will be swung in one direction across the outlet of the dough hopper, and when the roller moves out of an indented part of the groove the cutter will be swung in the opposite direction across the outlet, and at each of these operations the dough projecting through the outlet or mold will be cut off. As the outlet is annular the cut-off portions of the dough will be in the form of rings.

As heretofore explained, the tubular shaft 12, which rotates the carrier or head, is driven by the shaft 15, while the tubular shaft 7, which operates the dough feeding devices is driven by the shaft 10. Power is applied to the shaft 15 through a clutch 34, for connecting the shaft to a suitable source of power, and the shaft 10 is driven from the shaft 15 by any one of a series of gears 35, of successively greater diameter, mounted on the latter shaft and adapted to be engaged by a gear 36, mounted in a yoke 37, which is slidable upon the shaft 10. The gear 36 meshes with a sliding gear 38 on the shaft 10. The yoke 37 may be swung about the shaft 10, to engage the gear 36 with any one of the change-speed gears 35, and the speed of the shaft 10 with respect to the shaft 15 may thus be changed as desired. The purpose of changing the relative speeds of the shafts 10 and 15 is to vary the speed of the dough feeding mechanism with respect to the cutting mechanism and thus vary the size of the doughnuts.

In operation, the shaft 15 is constantly driven and this, through the outer tubular shaft 12, causes the carrier A to rotate at a constant speed about the axis of the fixed shaft 4. The carrier projects over a tank $t$, adapted to contain hot grease, for frying the doughnuts, and within the tank, submerged in the grease, is a conveyer belt $s$ for receiving the doughnuts as they are cut off from the hoppers. The upper cam 6 is arranged so that as the hoppers swing over the tank above the feed belt, the clutch lever 26, associated with each hopper, will engage the part $b^2$ of the cam groove and this will cause the clutch members 24 to engage and drive the feed screw. The hoppers are, of course, kept filled with dough and the feed screw will force dough through the annular outlet or mold in the bottom of the hopper as long as the clutch lever engages the part $b^2$ of the groove. Before the hopper has passed from above the feed belt, the clutch lever rides into the part $b'$ of the groove, which has a greater radius than the part $b^2$, and the clutch lever is moved to disengage the clutch members and the feed screw stops until the hopper has again moved over the belt, when the clutch members are again engaged and the feeding commences. The cam 3 is so placed that the rollers on the rack bars 32 will ride in the long concentric portion $c'$ of the groove when the hoppers are beyond the tank, so that the cutters will not operate until the hoppers approach the end of the tank. Shortly before each hopper swings over the tank, the roller on the rack bar controlling the cutter associated with said hopper enters the depression $c^2$ in the cam groove and then moves out of the depression, thus causing the cutter to swing back and forth across the outlet opening of the hopper and to cut off any dough that may have oozed through the opening while the feed screw was stationary. The hopper then moves over the feed belt and the feed screw commences to operate as above described and to feed dough through the annular outlet of the hopper. The roller on the rack bar controlling the cutter then moves into the depression $c^3$, causing the cutter to swing across the face of the mold and cut off the doughnut which has been pressed through the outlet. As the roller moves out of the depression, another doughnut is cut off and, in the same way, as the roller moves into and out of the successive depressions $c^4$, $c^5$, etc., the knife moves back and forth across the outlet of the hopper, cutting off a doughnut at each movement. When the hopper reaches a point where it is about to pass from over the belt, the roller controlling the cutter rides into the part $c'$ of the groove and the cutter then remains stationary until the hopper again approaches the tank, when the cutting operations above described are repeated.

In order to vary the thickness of the doughnuts, the speed of the shaft 10 may be varied with relation to the shaft 15 by engaging the gear 36 with a different gear in the series 35. For instance, the speed of the shaft 15, which causes the operation of the cutters, being constant, if the speed of the shaft 10, which operates the feed screw in the dough hopper, is increased, more dough will be forced through the outlet of the hopper between successive movements of the cutter; but if the speed of the shaft 10 be decreased, less dough will be forced from the hopper between successive movements of the cutter, and hence the size of the doughnuts can be regulated by varying the relative speeds of the shafts 10 and 15.

The doughnut making machine above described may be used in connection with any suitable frying apparatus, but it is intended more particularly for use in connection with the frying apparatus described in my copending application above mentioned, wherein the raw doughnuts are received, as dropped from the hoppers, upon a conveyer submerged in the hot grease and carried beneath a submerged stretch of another conveyer, against which they are held by the power of flotation while they are carried through the grease.

In the drawings, the outlets of the dough hoppers are annular, to mold the doughnuts in the usual ring form; but the outlets may be shaped in various ways to mold the doughnuts in different forms or patterns, as desired.

What I claim is:

1. In a doughnut-making machine, a carrier and means for moving the same continuously, a dough hopper on the carrier and having an outlet, means for forcing dough through the outlet during a part only of the travel of the hopper, and means for cutting off the ejected dough at intervals.

2. In a doughnut-making machine, a rotatably mounted carrier and means for rotating the same, a plurality of dough hoppers on said carrier, said hoppers having outlets, a device in each hopper for forcing dough through the outlet during a part only of the travel of the hopper, a cutter associated with each hopper, and means for operating said cutters to cut off sections of the ejected dough.

3. In a doughnut-making machine, a rotatably mounted carrier and means for rotating the same, a hopper on the carrier and having an outlet, a device for forcing dough through said outlet, means for operating said device during a part only of the travel of the hopper, a cutter movable transversely of the outlet, and means for operating said cutter prior to and during the operation of said device.

4. In a doughnut-making machine, a shaft, a carrier thereon, a dough hopper on the carrier and having an outlet, a second shaft, means operated by said latter shaft for forcing dough through said outlet, a cutter operated at intervals by the movement of the carrier for cutting off the ejected dough, and means for driving said shafts.

5. In a doughnut-making machine, a shaft, a carrier thereon, a dough hopper on the carrier and having an outlet, a second shaft, means operated by said latter shaft for forcing dough through said outlet, a cutter operated at intervals by the movement of the carrier for cutting off the ejected dough, means for driving said shafts, and change speed gearing for changing the relative speeds of said shafts to vary the size of the doughnuts.

6. In a doughnut-making machine, two concentric shafts and means for driving the same, a gear secured to one of said shafts, a head secured to the other shaft, hoppers secured to the head and provided with outlets, a dough feeding device in each hopper, separate shafts on the head for operating said devices from said gear, clutches for controlling said latter shafts, said clutches having levers, a stationary cam ring engaged by said levers, cutters secured to said head and movable across said outlets, separate devices for operating said cutters, and a stationary cam ring engaged by said latter devices.

7. In a doughnut-making machine, an upright post, two hollow shafts surrounding said post, a hollow standard surrounding said shafts, cam rings carried by said post and standard, respectively, a head secured to one of said shafts and rotatable between said cam rings, a dough hopper on said head and having an outlet, a device for forcing dough from the hopper, gearing connecting said device with the other of said shafts and including a clutch having a lever engaging one of said cam rings, a cutter mounted on the head and movable across the outlet of the hopper, and means, engaging the other of said cam rings, for operating said cutter.

8. In a doughnut-making machine, an upright post, two hollow shafts surrounding said post, a hollow standard surrounding said shafts, cam rings carried by said post and standard, respectively, a head secured to one of said shafts and rotatable between said cam rings, a dough hopper on said head and having an outlet, a device for forcing dough from the hopper, gearing connecting said device with the other of said shafts and including a clutch having a lever engaging one of said cam rings, a cutter mounted on the head and movable across the outlet of the hopper, means, engaging the other of said cam rings, for operating said cutter, drive shafts geared to said hollow shafts, and change-speed gearing for operating said shafts at different relative speeds.

In testimony whereof I affix my signature.

DANIEL M. LUEHRS.